(12) United States Patent
Inaba et al.

(10) Patent No.: US 6,774,789 B2
(45) Date of Patent: Aug. 10, 2004

(54) HUMAN BODY DETECTOR (75) Inventors: Hisashi Inaba, Kariya (JP); Yuichi Murakami, Chiryu (JP); Kiyokazu Ieda, Chiryu (JP); Eiji Mushiake, Aichi-ken (JP); Hiroki Okada, Toyota (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/925,308

(22) Filed: Aug. 10, 2001

(65) Prior Publication Data

US 2002/0030594 A1 Mar. 14, 2002

(30) Foreign Application Priority Data

Aug. 11, 2000 (JP) ........................................ 2000-244490

(51) Int. Cl.[7] .............................................. G08B 13/00
(52) U.S. Cl. ........................ 340/541; 340/562; 340/567; 340/568.1; 340/602
(58) Field of Search ................................. 340/541, 426, 340/562, 602, 573.1, 576, 5.53, 567, 568.1

(56) References Cited

U.S. PATENT DOCUMENTS

| 3,973,208 | A | * | 8/1976 | Diamond ................ 340/258 B |
| 5,682,032 | A | * | 10/1997 | Philipp .................. 340/825.31 |
| 5,682,788 | A | * | 11/1997 | Netzer .......................... 73/73 |
| 5,708,409 | A | * | 1/1998 | Schwimmer et al. ........ 340/426 |
| 5,764,145 | A | * | 6/1998 | Hansson et al. ............ 340/562 |
| 5,801,340 | A | | 9/1998 | Peter |
| 5,880,538 | A | | 3/1999 | Schulz |
| 6,075,294 | A | * | 6/2000 | Van den Boom et al. .. 340/562 |
| 6,339,376 | B1 | * | 1/2002 | Okada .......................... 340/562 |

FOREIGN PATENT DOCUMENTS

| JP | 7-189538 A | 7/1995 |
| JP | 10-306639 A | 11/1998 |
| JP | 10-308149 A | 11/1998 |

* cited by examiner

Primary Examiner—Jeffery Hofsass
Assistant Examiner—Hung Nguyen
(74) Attorney, Agent, or Firm—Burns, Doane, Swecker & Mathis, L.L.P.

(57) ABSTRACT

In a human body detector, a wave-detection circuit for detecting waves of a resonance voltage is connected to a sensor resonance circuit that varies a constant frequency voltage in accordance with a change in the capacitance of a sensor electrode. The wave-detection circuit is connected to a differentiator that acquires a changing rate by differentiating the wave-detection voltage with respect to time, and allows a voltage to pass if the changing rate of the voltage is greater than or equal to a predetermined value. The differentiator is connected to a high-pass filter that allows passage of a voltage whose changing rate is greater than or equal to a second predetermined value. The high-pass filter is connected to a comparator whose non-inversion input terminal is connected to a power source that applies thereto a reference voltage.

8 Claims, 9 Drawing Sheets

ND BODY DETECTOR

HUMAN BODY DETECTOR

INCORPORATION BY REFERENCE

The disclosure of Japanese Patent Application No. 2000-244490 filed on Aug. 11, 2000 including the specification, drawings and abstract is incorporated herein by reference in its entirety.

BACKGROUND OF THE INVENTION

1. Field of the Invention

The invention relates to a capacitance-type human body detector for use outdoors for detecting a human body and, more particularly, to a human body detector capable of distinguishing a human body from raindrops.

2. Description of the Related Art

A technology capable of detecting approach of a human body is disclosed in Japanese Patent Application Laid-Open No. 10-308149, wherein a human body detecting sensor is disposed in a hollow door handle of a vehicle so as to detect a user approaching the vehicle. Furthermore, a generally-termed smart entry system for locking and unlocking a door of a vehicle when a user carrying a wireless transmitter approaches or moves away from the vehicle is disclosed in, for example, Japanese Patent Application Laid-Open Nos. 7-189538 and 10-306639.

However, in systems as mentioned above, it is necessary to prevent a door from being unlocked when a user merely passes by the vehicle without an intention of opening the door.

Therefore, consideration has been given to a technology in which a capacitance-type sensor for detecting a human body is provided in a door handle, and the door unlocking is performed based on the AND of an output of the human body-detecting capacitance-type sensor and a signal from a wireless transmitter.

However, if a human body-detecting capacitance-type sensor is provided in a door handle, there is a problem of false detection of a human body caused by raindrops striking the door handle. More specifically, in a capacitance-type sensor, a capacitance detecting portion is provided in, for example, a door handle grip, and a change in the detected capacitance is recognized. That is, when a human hand contacts the handle grip, the stray capacitance of the human hand changes the capacitance. Therefore, upon such a capacitance change, the sensor detects contact of a human hand with the handle grip. However, the stray capacitance of a raindrop also changes the capacitance of the sensor. Therefore, in some cases, a raindrop causes detection means of the sensor to make a false detection, thus leading to useless generation of a human body detection signal or a request signal to a wireless transmitter carried by a user.

SUMMARY OF THE INVENTION

It is an object of the invention to provide a human body detector capable of distinguishing between a raindrop and a human body.

A first aspect of the invention is a human body detector including a capacitance-type sensor that a human body contacts, and detection means for receiving an output of the capacitance-type sensor, and distinguishing the human body from a raindrop and detecting only the human body based on an output frequency of the output.

A second aspect of the invention is a human body detector including a capacitance-type sensor that a human body contacts, and detection means for receiving an output of the capacitance-type sensor, and distinguishing between the human body from a raindrop and detecting only the human body based on a change in the output within a predetermined time.

According to the first and second aspects of the invention, when a dielectric object, such as a human body or the like, contacts the capacitance-type sensor, the capacitance of the capacitance-type sensor changes, so that the output of the sensor changes. The output frequency and the changing rate of the capacitance vary depending on objects. Therefore, the output change of the capacitance-type sensor varies depending on objects detected. More specifically, for example, when the capacitance-type sensor detects a raindrop, the output of the sensor reduces by a predetermined amount in at most 5 msec (in frequency, at least 200 Hz). In contrast, when the capacitance-type sensor detects a human hand that is not wet, the output of the sensor reduces by the predetermined amount in about 10 to 50 msec (in frequency, about 100 to 20 Hz). Thus, the changing rate (frequency) of the output differs between a raindrop and a human body. The detection means distinguishes objects based on the aforementioned characteristic. That is, the detection means calculates the changing rate or frequency of the output, and determines whether the changing rate (frequency) is the changing rate (frequency) that occurs when a human body is detected. If it is determined that the calculated changing rate is the changing rate (frequency) caused by a human body, the human body detector outputs a human body detection signal.

Therefore, according to the first and second aspects, the human body detector is able to distinguish between a raindrop and a human body, and therefore does not make a false detection based on a raindrop, therefore does not commit an error of unlocking to the door.

In the second aspect, the detection means may allows a voltage to pass if a changing rate of the voltage is in a predetermined band.

Therefore, the detection means stores the changing rate of voltage that occurs when a human body contacts the capacitance-type sensor. The changing rate of voltage may be determined by using a time needed for a predetermined amount of voltage reduction, or may also be determined by using an amount of voltage reduction in a predetermined time. In an example herein, the former method is adopted. For example, the changing rate that occurs when 40 msec is needed for a predetermined amount of reduction of voltage is stored in the detection means. When a human body contacts the capacitance-type sensor, the detection means calculates a changing rate of voltage, and detects that the calculated changing rate is within the stored band of changing rate, and then outputs a human body detection signal. If the capacitance of the capacitance-type sensor is changed by a raindrop, the detection means acquires the changing rate of voltage, and determines whether the acquired changing rate is a changing rate stored. In the case of a raindrop, because the voltage of the sensor reduces by a predetermined amount in at most 5 msec, the detection means detects that the acquired changing rate of voltage is not within the band of changing rate, so that the human body detection signal is not outputted. If the capacitance of the capacitance-type sensor is changed by an outside air temperature change, the detection means acquires a changing rate of voltage, and determines whether the acquired changing rate of voltage is a stored changing rate of voltage. As for the outside air temperature change, the predetermined amount of reduction of the voltage requires a time that is far longer than, for example, 500 msec. Therefore, the detection means detects that the acquired changing rate of voltage is not within the stored band of changing rate of voltage, so that the human body detection signal is not outputted.

Therefore, according to this aspect of the invention, even if the capacitance of the capacitance-type sensor changes due to a raindrop, an outside air temperature change or the like, the human body detector does not output the human body detection signal. The human body detector detects only a human body, and detects the human body detection signal.

The human body detection signal avoids an event that a raindrop or the like is falsely detected and the door is unlocked.

Therefore, the human body detector can be effectively used outdoors.

In the foregoing aspects of the invention, the detection means may include a band-pass filter.

Therefore, a condition for allowing voltage to pass through the band-pass filter provided in the detection means is that the changing rate of the voltage be within a band of changing rate of voltage needed for detection of a human body (a band of changing rate that occurs when the predetermined amount of reduction of voltage requires 10 to 50 msec). If frequency is used instead, a similar effect can be achieved by employing a band-pass filter that allows passage of frequency of 100 to 20 Hz corresponding to time of 10 to 50 msec.

Therefore, according to this aspect, even if the human body stray capacitance varies depending on persons, a human body can be reliably detected, and the detection accuracy can be improved.

In the foregoing aspects, the human body detector may be disposed in a door handle of a motor vehicle, and may detect a contact between the door handle and the human body.

If the human body detector is disposed within a door handle disposed on an outer side of a door, a human body does not directly contact the human body detector, so that the human body detector is made less liable to failure.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
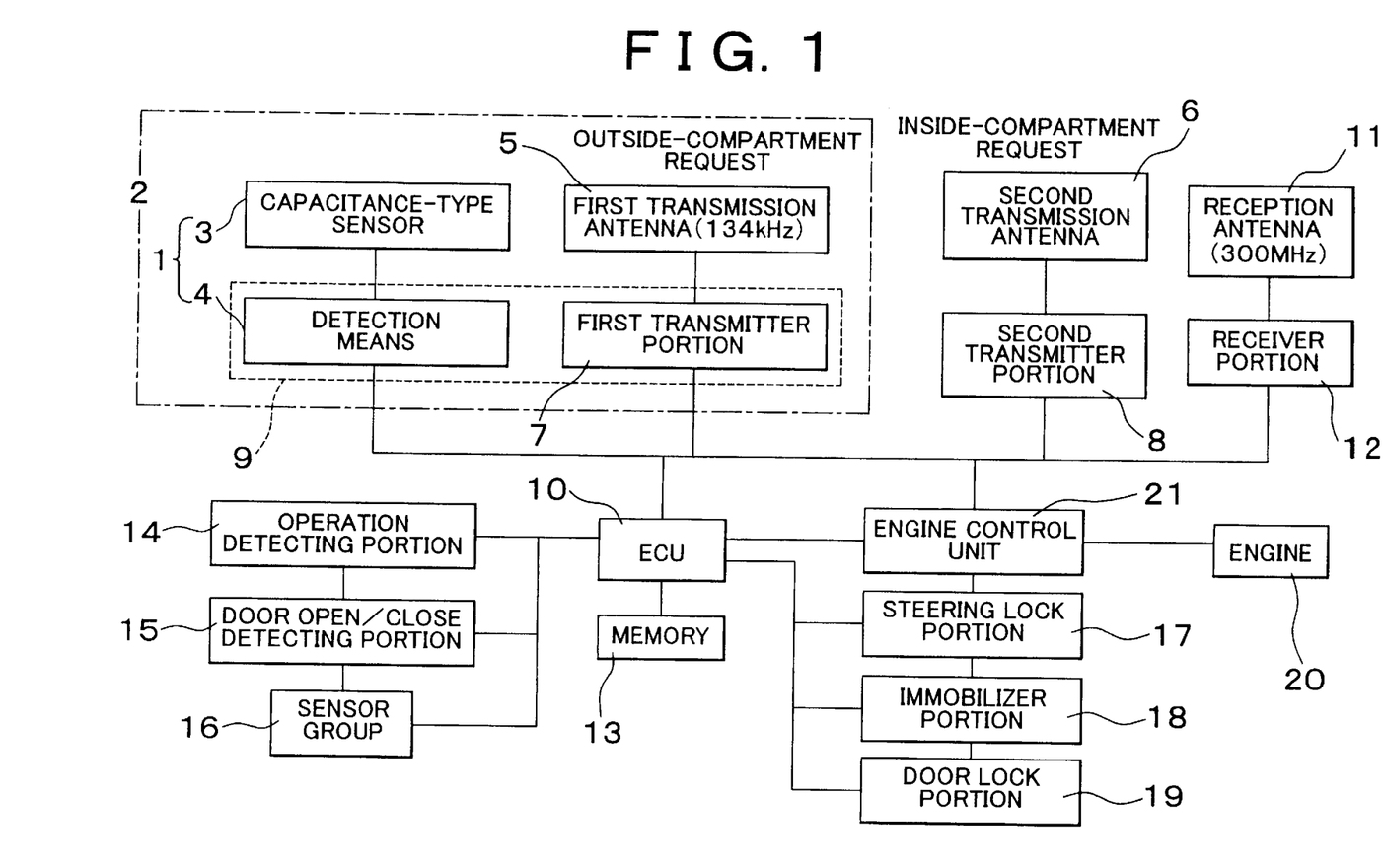
FIG. 1 is a block diagram of a smart entry system in accordance with an embodiment of the human body detector of the invention.

A preferred embodiment of the human body detector of the invention will be described hereinafter with reference to the accompanying drawings. In this embodiment, a human body detector 1 is installed in a vehicle-installed apparatus 2 of a smart entry system. FIG. 1 is a block diagram of the smart entry system.

The human body detector 1 installed in the vehicle-installed apparatus 2 has a capacitance-type sensor 3, and a detection means 4 that outputs a human body detection signal based on a change in output of the capacitance-type sensor 3. The vehicle-installed apparatus 2 has two antennas: a first transmission antenna 5 and a second transmission antenna 6. The first transmission antenna 5 is provided in a door handle of a door of a vehicle (four-wheel vehicle). The second transmission antenna 6 is provided near an instrument panel in a compartment of the vehicle. The first transmission antenna 5 and the second transmission antenna 6 are connected to a first transmitter portion 7 and a second transmitter portion 8, respectively. The first transmitter portion 7, together with the detection means 4, forms an outside-compartment transmitter 9. The detection means 4, the first transmitter portion 7 and the transmitter portion 8 are connected to an ECU (electronic control unit) 10.

The ECU 10 receives from the detection means 4 the human body detection signal indicating that a human body has contacted or has approached the door handle. The ECU 10 supplies first and second request codes to the first transmitter portion 7 and the second transmitter portion 8, respectively. The first and second request codes are modified in frequency. The modified request signals, for example, of a modified frequency of 134 kHz, are transmitted to a user-carried device (not shown) from the first transmission antenna 5 and the second transmission antenna 6. The transmission of the request signal from the first transmission antenna 5 will be referred to as "outside-compartment request". The transmission of the request signal from the second transmission antenna 6 will be referred to as "inside-compartment request". In a real circuit arrangement, the first transmitter portion 7 and the second transmitter portion 8 may be combined into a single circuit. A reception antenna 11 is provided in the vehicle. A signal received by the reception antenna 11 from the user-carried device (not shown), for example, a signal having a frequency of 300 MHz, is demodulated by a receiver portion 12, and is then supplied to the ECU 10.

A memory 13 is connected to the ECU 10. The memory 13 stores therein a plurality of codes that are different from one another, for example, a first code for door lock, a second code for engine start, a transponder ID code, etc. The memory 13 is a non-volatile memory such as an EEPROM or the like, and retains the stored content even after being powered off.

The ECU 10 is also connected to an operation detecting portion 14, a door open/closure detecting portion 15, and a sensor group 16. The operation detecting portion 14 detects various switch operations performed by a user. For example, the operation detecting portion 14 detects an operation of an ignition switch, and supplies an operating human body detection signal to the ECU 10. The door open/closure detecting portion 15 detects the open/closure of a driver's side door (or the open/closure of each door), and supplies a corresponding human body detection signal to the ECU 10. The sensor group 16 includes various sensors for detecting the open/closure of windows, the vehicle speed, etc. Human body detection signals from the various sensors are supplied to the ECU 10.

The ECU 10 is also connected to a steering lock portion 17, an immobilizer portion 18, and a door lock portion 19. The steering lock portion 17 is a mechanism for mechanically prohibiting the operation of a steering device. The immobilizer portion 18 is a mechanism for prohibiting the supply of fuel to an engine 20 and the ignition operation. The door lock portion 19 is a mechanism for locking and unlocking all the doors. The ECU 10 is connected to an engine control unit 21. The engine control unit 21 controls the starting of the engine 20 through the use of a starter motor, and also controls the driving and stopping of the engine 20.

Figure 2:
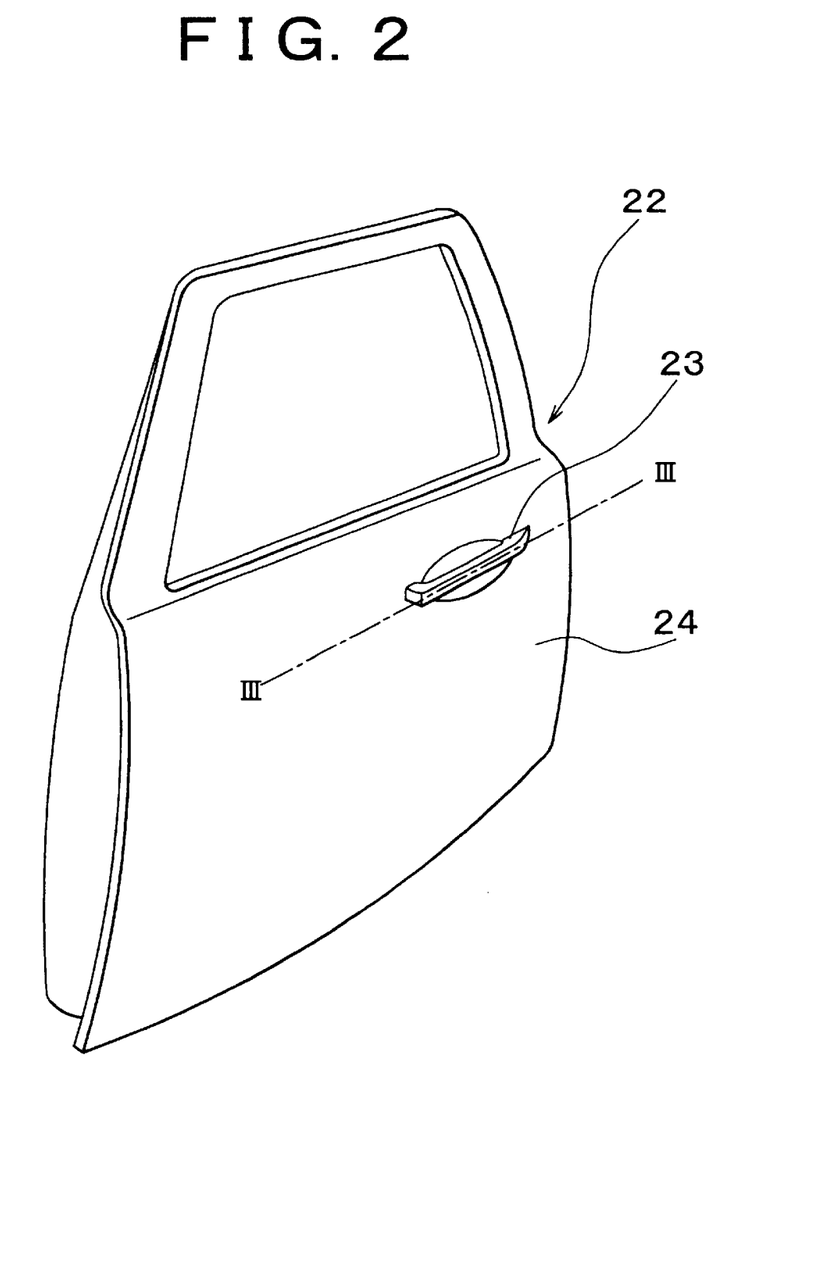
FIG. 2 is a perspective view of a door of a vehicle in accordance with the embodiment.
Figure 3:
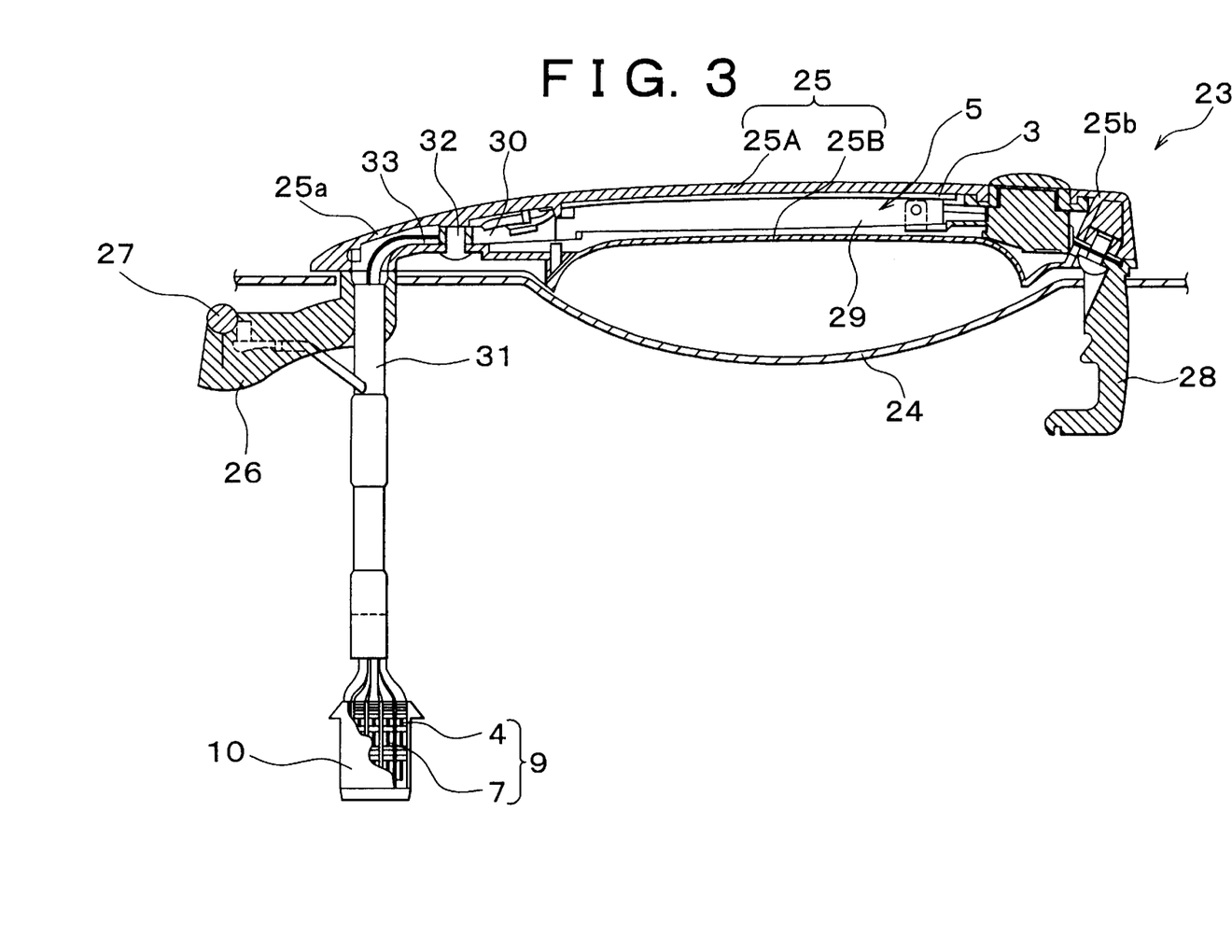
FIG. 3 is a sectional view taken on line III—III in FIG. 2.
Figure 4:
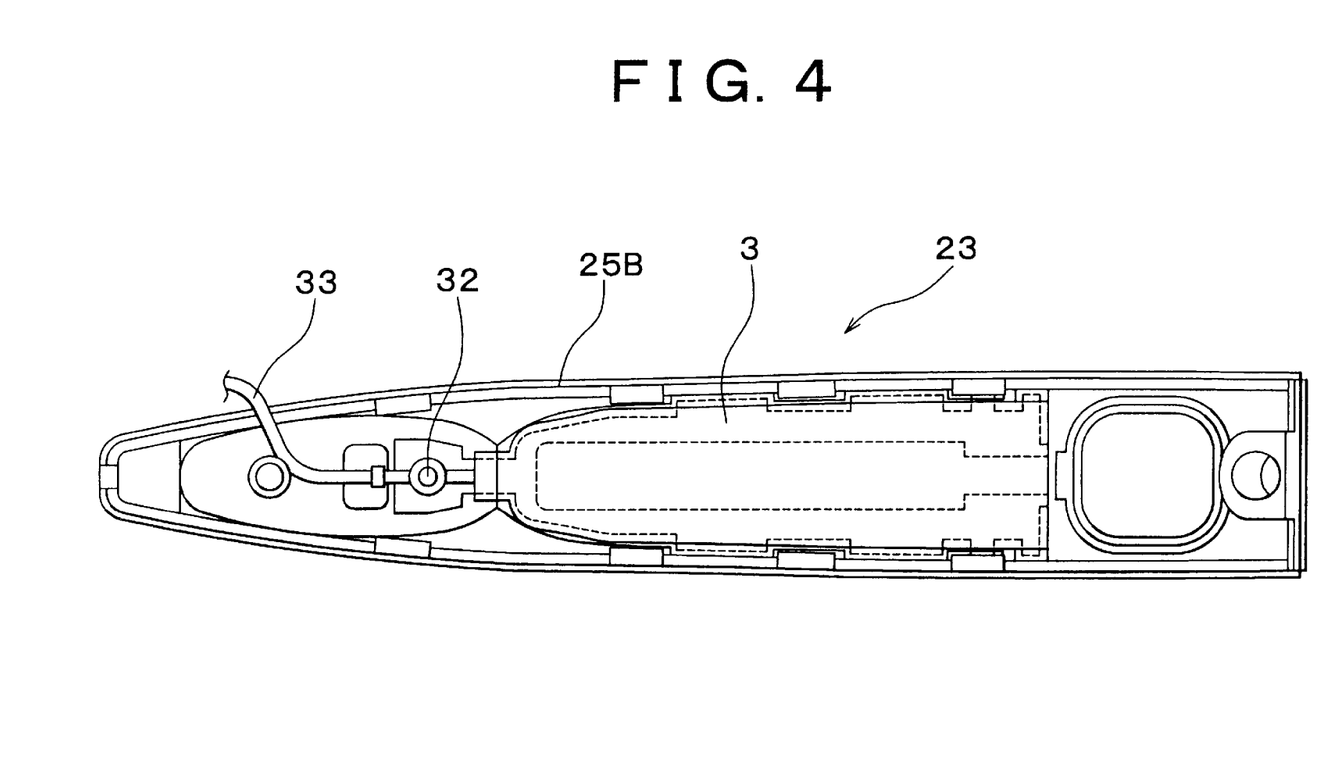
FIG. 4 is a diagram showing an internal construction of a door handle in accordance with the embodiment.

The vehicle-installed apparatus 2 is mounted in a door 22 of the vehicle. FIG. 2 is a perspective view of the door 22. FIG. 3 is a sectional view taken on line III—III in FIG. 2. FIG. 4 is a diagram showing an internal construction of a door handle 23.

As shown in FIG. 2, the door handle 23 is attached to the door 22 in such a manner that the door handle 23 is protruded from a metallic door outer plate 24 outwardly in a direction of the vehicle width. The door handle 23 is supported at its two ends by the door outer plate 24, and has a structure that allows the door handle 23 to be gripped by a human hand in order to open or close the door 22.

As shown in FIG. 3, a handle grip 25 of the door handle 23 is formed to have a pipe shape by fitting a pair of handle covers 25A, 25B. The first transmission antenna 5 is contained in the handle grip 25. An arm 26 extends from an end portion 25a of the handle grip 25. The arm 26 extends through the door outer plate 24, and is thus inserted within the door 22, in which the arm 26 is rotatably supported on a rotation shaft 27. A lever 28 extends from another end portion 25b of the handle grip 25. The lever 28 extends through the door outer plate 24, and is thus inserted within the door 22, in which the lever 28 is connected to a door opening/closing mechanism (not shown).

The first transmission antenna 5 contained within the handle grip 25 is formed by winding a coil wire (not shown) around an outer peripheral surface of a resin-made case 29 that contains a ferrite plate (not shown). The first transmission antenna 5 is connected to the first transmitter portion 7 via a capacitor 30 and a wire harness 31.

The capacitance-type sensor 3 is disposed between the case 29 of the first transmission antenna 5 and an inner side surface of the handle cover 25A of the handle grip 25 as shown in FIG. 3. The capacitance-type sensor 3 is formed as shown in FIG. 4 by attaching water-proof films onto both sides surfaces of a generally rectangular copper or brass sheet of about 0.2 mm in thickness. The capacitance-type sensor 3 is connected to the detection means 4 via a harness 33 passed through a protrusion 32.

Figure 5:
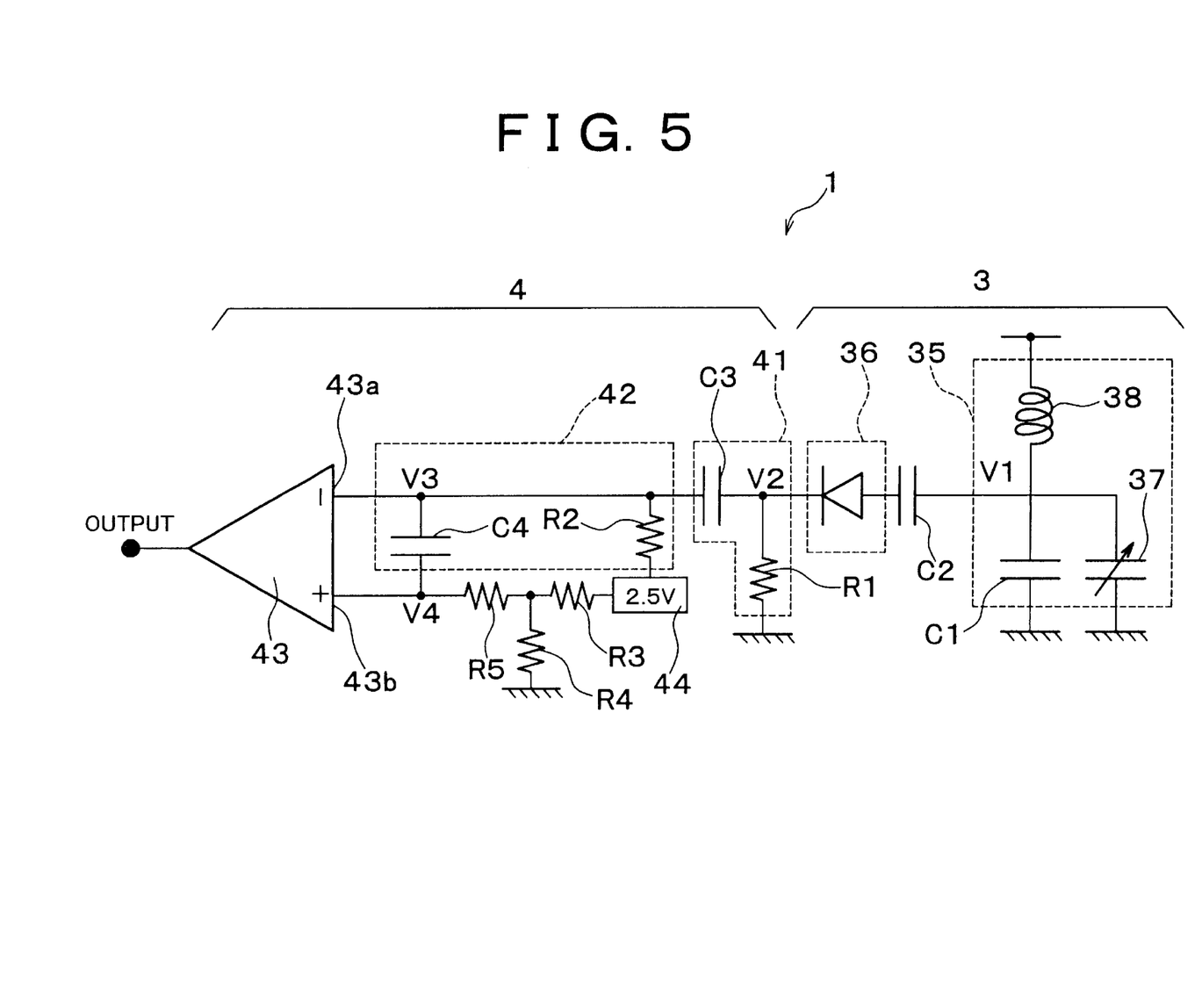
FIG. 5 is a diagram illustrating a circuit arrangement of a human body detector in accordance with the embodiment.

Next described will be the human body detector 1, which is a gist of the invention. FIG. 5 is a diagram illustrating a circuit arrangement of the human body detector 1. The capacitance-type sensor 3 of the human body detector 1 is made up of a sensor resonance circuit 35 and a wave detector circuit 36. The sensor resonance circuit 35 has a sensor electrode 37. When a dielectric, such as a human body or the like, contacts or approaches the sensor electrode 37, the capacitance of the sensor electrode 37 changes due to the stray capacitance of the contacting or approaching dielectric. The sensor electrode 37 is connected to a resonance circuit made up of a capacitor C1 and a coil 38 supplied with a constant frequency voltage (e.g., of 134.2 kHz) from a power source (not shown). Therefore, the sensor resonance circuit 35 outputs a constant frequency voltage during a steady state where the sensor electrode 37 is not in contact with anything. If an object contacts or approaches the sensor electrode 37 and the capacitance thereof changes, the sensor resonance circuit 35 outputs a voltage formed by changing the amplitude of the constant frequency voltage in accordance with the change in the capacitance.

The wave detector circuit 36 detects a resonance voltage V1 outputted from the sensor resonance circuit 35, and converts it into a direct-current voltage.

The detection means 4 of the human body detector 1 is made up of a differentiator 41, a high-pass filter 42, a comparator 43, and a power source 44.

The differentiator 41 differentiates a wave detection voltage V2 from the wave detector circuit 36 with respect to time, so as to acquire a changing rate $\tau$ of the wave detection voltage V2. If the changing rate $\tau$ is greater than or equal to a predetermined value $\tau A$, the differentiator 41 allows the wave detection voltage V2 to pass. In this embodiment, the predetermined value $\tau A$ is set to a changing rate that occurs when 50 msec is needed for a predetermined amount of reduction in the wave detection voltage V2.

The high-pass filter 42 allows passage of the wave detection voltage V2 if the changing rate $\tau$ of the wave detection voltage V2 passed through the differentiator 41 is greater than a predetermined value $\tau B$. In this embodiment, the predetermined value $\tau B$ is set to a changing rate that occurs when 5 msec is needed for the predetermined amount of reduction in the wave detection voltage V2.

The comparator 43 outputs a human body detection signal when the voltage applied to an inversion input terminal 43a is less than the voltage applied to a non-inversion input terminal 43b. The non-inversion input terminal 43b of the comparator 43 is connected via resistors R3 to R5 to the power source 44, which supplies a voltage of 2.5 V, so that a reference voltage V4 is applied to the non-inversion input terminal 43b. The non-inversion input terminal 43b of the comparator 43 is also connected to the high-pass filter 42 so that a filter voltage V3 passed through the high-pass filter 42 is applied to the non-inversion input terminal 43b. On the other hand, the inversion input terminal 43a of the comparator 43 is connected to the high-pass filter 42 so that a filter voltage V3 that is not allowed to pass through the high-pass filter 42 is applied to the inversion input terminal 43a. Consequently, if the changing rate $\tau$ of the voltage meets the condition of $\tau A \leq \tau \leq \tau B$, the comparator 43 outputs the human body detection signal. Thus, together with the differentiator 41 and the high-pass filter 42, the comparator 43 forms a band-pass filter.

Figure 6A:
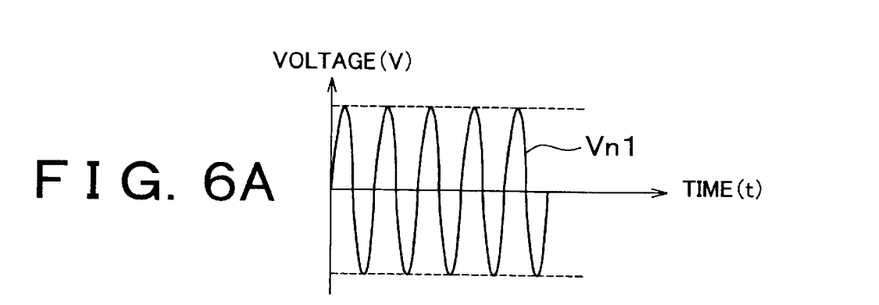
FIGS. 6A to 6C are diagrams indicating voltage changes in various portions of the human body detector during a steady state, wherein FIG. 6A indicates a resonance voltage, FIG. 6B indicates a wave detection voltage, and FIG. 6C indicates a filter voltage and a reference voltage.
Figure 6B:
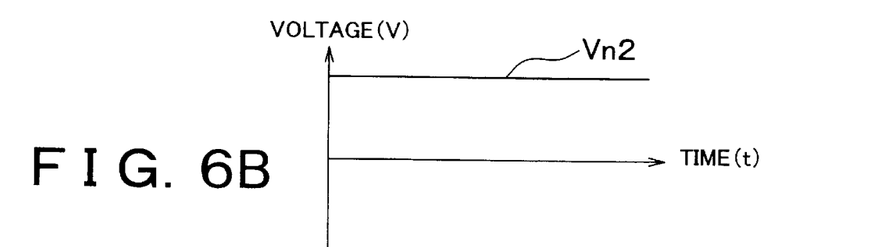
Figure 6C:
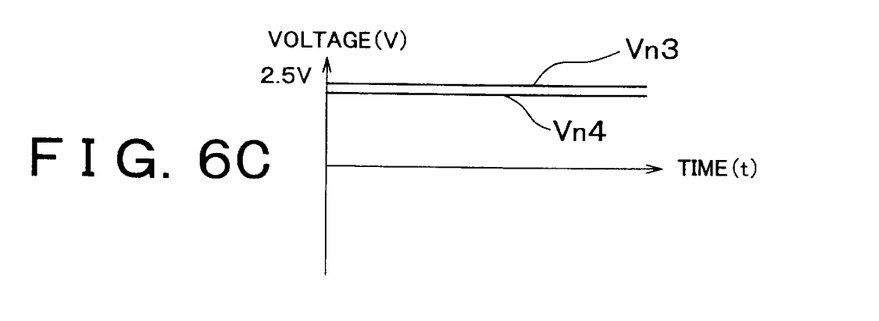

Next described will be an operation of the smart entry system constructed as described above. A steady state in which no object is in contact with the handle grip 25 will first be described. FIGS. 6A to 6C are diagrams indicating voltage changes in various portions of the human body detector 1 during the steady state. FIG. 6A indicates a resonance voltage Vn1. FIG. 6B indicates a wave detection voltage Vn2. FIG. 6C indicates a filter voltage Vn3 and a reference voltage Vn4.

The coil 38 is supplied with a constant frequency voltage of 134.2 kHz from a power source (not shown). Since there is nothing in contact with the handle grip 25 and there is no change in the capacitance of the sensor electrode 37, the sensor resonance circuit 35 outputs the resonance voltage Vn1 with a constant amplitude as indicated in FIG. 6A. The resonance voltage Vn1 is changed into and discharged from a capacitor C2, and is thereby supplied to the wave detector circuit 36. The wave detector circuit 36 detects the waves of the resonance voltage Vn1 and converts it into a DC voltage, and then outputs the wave detection voltage Vn2. The differentiator 41 acquires a changing rate $\tau 1$ of the wave detection voltage Vn2 by differentiating the wave detection voltage Vn2 with respect to time. During the steady state, the wave detection voltage Vn2 does not change but remains flat as indicated in FIG. 6B, and therefore the changing rate $\tau 1$ is "0". Therefore, the wave detection voltage Vn2 is not allowed to pass through the differentiator 41, which allows passage of a voltage having a changing rate $\tau$ that is greater than or equal to $\tau A$.

Therefore, the high-pass filter 42 is supplied with a voltage of 2.5 V from the power source 44. The changing rate $\tau 2$ of this voltage is substantially "0", and is therefore not allowed to pass through the high-pass filter 42, which allows passage of a voltage having a changing rate $\tau$ that is greater than $\tau B$. Therefore, the voltage supplied from the power source 44 is applied to the inversion input terminal 43a. In this case, the filter voltage Vn3 exhibits a constant value (2.5 V) as indicated in FIG. 6C.

On the other hand, the non-inversion input terminal 43b of the comparator 43 receives a voltage from the power source 44. Since the resistors R3 to R5 are provided between the non-inversion input terminal 43b and the power source 44, the reference voltage Vn4 applied to the non-inversion input terminal 43b is slightly lower than 2.5 V as indicated in FIG. 6C.

Therefore, since the voltage applied to the inversion input terminal 43a is greater than the voltage applied to the non-inversion input terminal 43b, the comparator 43 does not output the human body detection signal. As a result, the ECU 10 does not output an unlock signal to the door lock portion 19, so that the door is not unlocked.

Figure 7A:
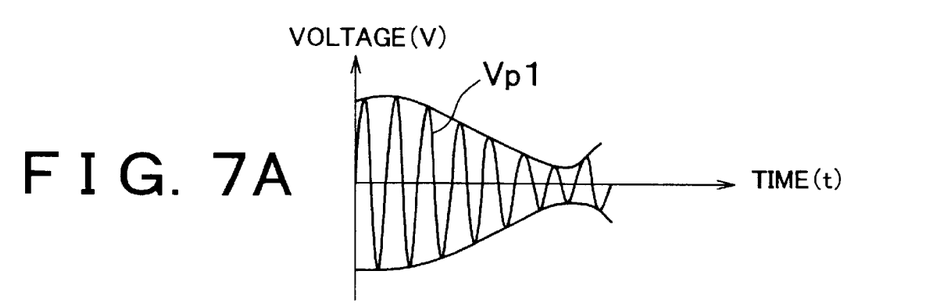
FIGS. 7A to 7C are diagrams indicating voltage changes in various portions of the human body detector when the human body detector detects a human body, wherein FIG. 7A indicates a resonance voltage, FIG. 7B indicates a wave detection voltage, and FIG. 7C indicates a filter voltage and a reference voltage.
Figure 7B:
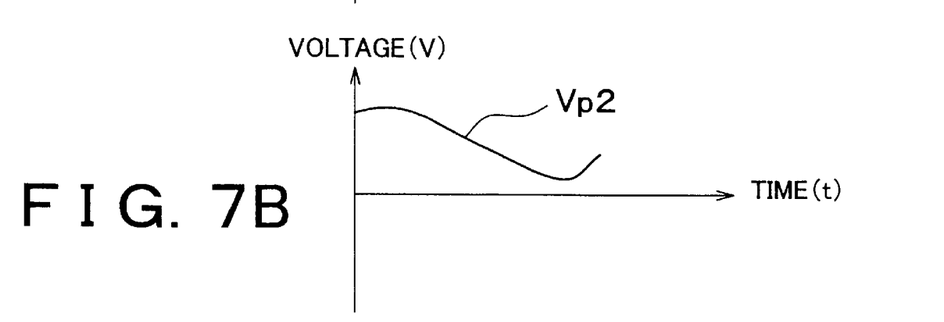
Figure 7C:
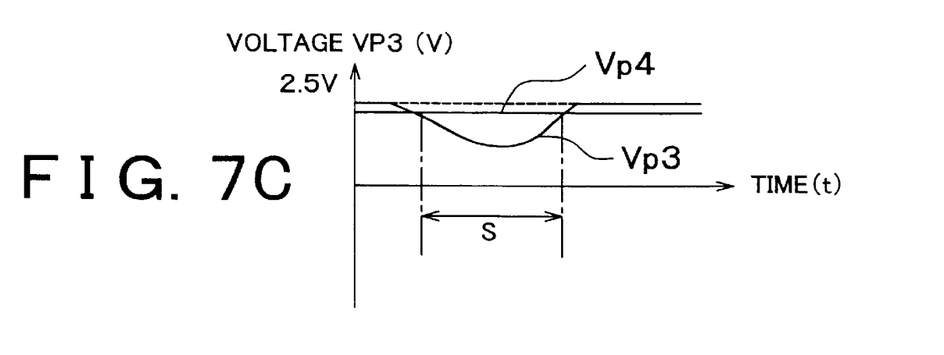

Next described will be a case where the human body detector 1 detects a human body. FIGS. 7A to 7C are diagrams indicating voltage changes in various portions of the human body detector 1 when the human body detector 1 detects a human body. FIG. 7A indicates a resonance voltage Vp1. FIG. 7B indicates a wave detection voltage Vp2. FIG. 7C indicates a filter voltage Vp3 and a reference voltage Vp4.

The coil 38 is supplied with a constant frequency voltage of 134.2 kHz from a power source (not shown). When a human grips the handle grip 25 or when a human brings her/his hand close to the handle grip 25, the capacitance of the sensor electrode 37 changes due to the stray capacitance of the human hand. Since the human hand stray capacitance varies depending on persons, the changing rate of the capacitance of the sensor electrode 37 also varies. An average is 10 to 50 msec. The sensor resonance circuit 35 integrates the constant frequency voltage supplied to the sensor resonance circuit 35 with respect to the stray capacitance, and outputs the resonance voltage Vp1 having a waveform as indicated in FIG. 7A.

The resonance voltage Vp1 is charged into and discharged from the capacitor C2, and then is supplied to the wave detector circuit 36. The wave detector circuit 36 outputs the wave detection voltage Vp2 obtained through wave detection and conversion of the resonance voltage Vp1. The wave detection voltage Vp2 reduces by the predetermined amount in, for example, 40 msec, and changes gently as indicated in FIG. 7B. The differentiator 41 differentiates the wave detection voltage Vp2 with respect to time to acquire a changing rate $\tau 3$ of the wave detection voltage Vp2. That is, the differentiator 41 acquires a changing rate $\tau 3$ occurring when, for example, 40 msec is needed for a predetermined reduction in the wave detection voltage Vp2. Since the changing rate $\tau 3$ of the wave detection voltage Vp2 is greater than or equal to the predetermined value $\tau A$, the wave detection voltage Vp2 is allowed to pass through the differentiator 41. The wave detection voltage Vp2 passed through the differentiator 41 is supplied to the high-pass filter 42. Since the changing rate $\tau 3$ of the wave detection voltage Vp2 is less than the predetermined value $\tau B$, the wave detection voltage Vp2 is not allowed to pass through the high-pass filter 42. Therefore, the filter voltage Vp3 from the high-pass filter 42 is applied to the inversion input terminal 43a of the comparator 43. The filter voltage Vp3 undergoes a voltage fall as indicated in FIG. 7C.

The non-inversion input terminal 43b of the comparator 43 receives a reference voltage Vp4 slightly lower than 2.5 V as indicated in FIG. 7C, as in the steady state. Comparison between the filter voltage Vp3 applied to the inversion input terminal 43a of the comparator 43 and the reference voltage Vp4 applied to the non-inversion input terminal 43b shows that the filter voltage Vp3 remains less than the reference voltage Vp4 for a time S. During the time S, the comparator 43 outputs the human body detection signal to the ECU 10. After receiving the human body detection signal, the ECU 10 acquires the AND of the signal and an outside-compartment request to output an unlock signal to the door lock portion 19 in order to unlock the door.

Figure 8A:
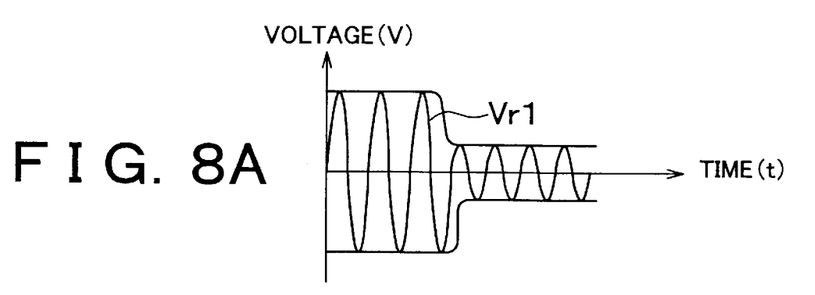
FIGS. 8A to 8C are diagrams indicating voltage changes in various portions of the human body detector when the human body detector detects a rain drop, wherein FIG. 8A indicates a resonance voltage, FIG. 8B indicates a wave detection voltage, and FIG. 8C indicates a filter voltage and a reference voltage.
Figure 8B:
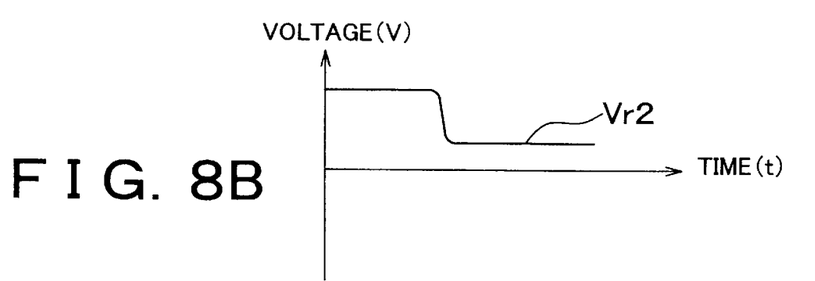
Figure 8C:
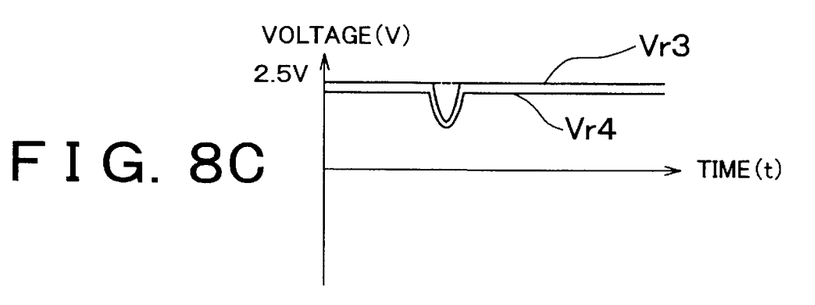

Next described will be an operation of the human body detector 1 performed when a raindrop contacts the sensor electrode 37. FIGS. 8A to 8C are diagrams indicating voltage changes in various portions of the human body detector 1 when the human body detector 1 detects a raindrop. FIG. 8A indicates a resonance voltage Vr1. FIG. 8B indicates a wave detection voltage Vr2. FIG. 8C indicates a filter voltage Vr3 and a reference voltage Vr4.

The coil 38 is supplied with a constant frequency voltage of 134.2 kHz from a power source (not shown). When a raindrop deposits on the handle grip 25, the capacitance of the sensor electrode 37 changes due to the stray capacitance of the raindrop. The sensor resonance circuit 35 integrates the constant frequency voltage with respect to the stray capacitance, and outputs a resonance voltage Vr1 having a waveform as indicated in FIG. 8A.

The resonance voltage Vr1 is charged into and discharged from the capacitor C2, and then is supplied to the wave detector circuit 36. The wave detector circuit 36 outputs the wave detection voltage Vr2 obtained through wave detection and conversion of the resonance voltage Vr1. The wave detection voltage Vr2 reduces by the predetermined amount in, for example, 3 msec, and thus changes sharply as indicated in FIG. 8B. The differentiator 41 differentiates the wave detection voltage Vr2 with respect to time to acquire a changing rate τ4 of the wave detection voltage Vr2. Since the changing rate τ4 of the wave detection voltage Vr2 is greater than or equal to the predetermined value τA, the wave detection voltage Vr2 is allowed to pass through the differentiator 41. The wave detection voltage Vr2 passed through the differentiator 41 is supplied to the high-pass filter 42. Since the changing rate τ4 of the wave detection voltage Vr2 is greater than the predetermined value τB, the wave detection voltage Vr2 passes through the high-pass filter 42, and is applied to the non-inversion input terminal 43b of the comparator 43. The filter voltage Vr3 undergoes a sharp voltage fall as indicated in FIG. 8C.

The reference voltage Vr4 supplied to the non-inversion input terminal 43b of the comparator 43 undergoes a voltage fall corresponding to the voltage fall of the filter voltage Vr3, as indicated in FIG. BC. The filter voltage Vr3 and the reference voltage Vr4 change correspondingly to each other so that the filter voltage Vr3 does not become lower than the reference voltage Vr4. Therefore, the comparator 43 does not output the human body detection signal. Hence, the ECU 10 does not output the unlock signal to the door lock portion 19, so that the door is not unlocked.

Figure 9A:
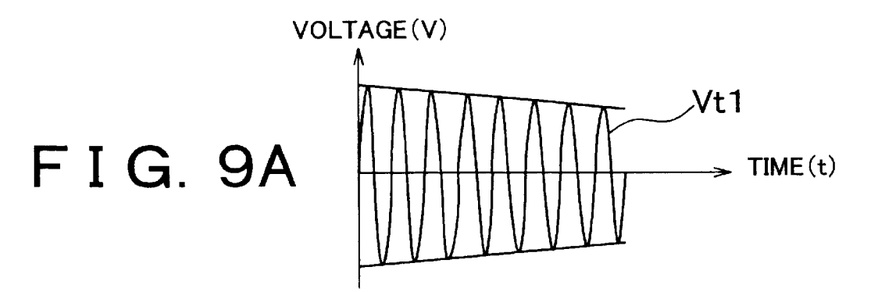
FIGS. 9A to 9C are diagrams indicating voltage changes in various portions of the human body detector when the human body detector detects a change in outside air temperature, wherein FIG. 9A indicates a resonance voltage, FIG. 9B indicates a wave detection voltage, and FIG. 9C indicates a filter voltage and a reference voltage.
Figure 9B:
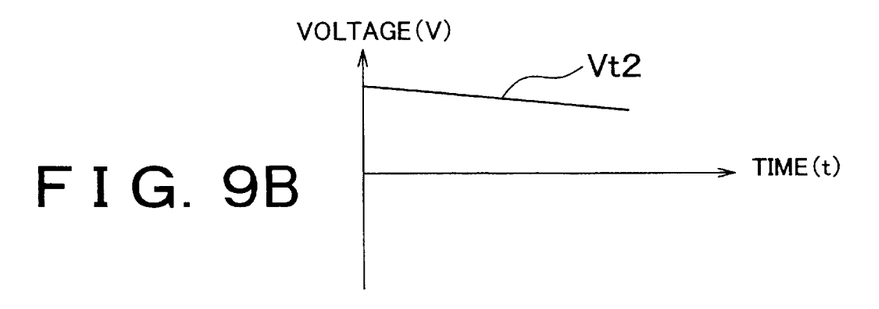
Figure 9C:
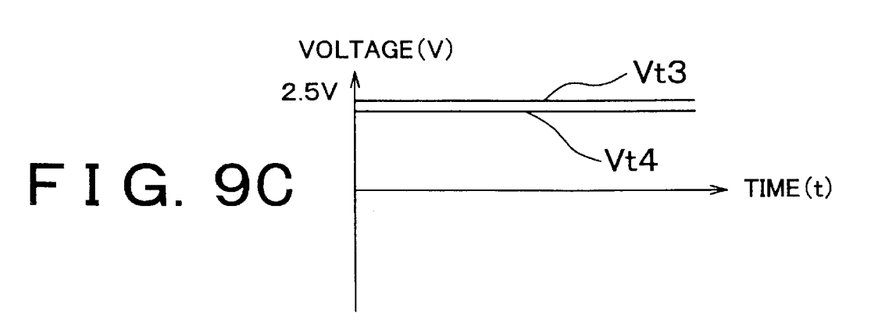

Next described will be an operation of the human body detector 1 in conjunction with a change in outside air temperature. FIGS. 9A to 9C are diagrams indicating voltage changes in various portions of the human body detector 1 when the human body detector 1 detects a change in outside air temperature. FIG. 9A indicates a resonance voltage Vt1. FIG. 9B indicates a wave detection voltage Vt2. FIG. 9C indicates a filter voltage Vt3 and a reference voltage Vt4.

The coil 38 is supplied with a constant frequency voltage of 134.2 kHz from a power source (not shown). When the outside air temperature gradually rises, the capacitance of the sensor electrode 37 changes. The constant frequency is integrated with respect to stray capacitance, and is outputted as a resonance voltage Vt1 having a waveform as indicated in FIG. 9A.

The resonance voltage Vt1 is charged into and discharged from the capacitor C2, and is supplied to the wave detector circuit 36. The wave detector circuit 36 outputs the wave detection voltage Vt2 obtained through wave detection and conversion of the resonance voltage Vt1. For example, in direct sunlight, the wave detection voltage Vt2 reduces by the predetermined amount in a time that is far longer than 500 msec, and thus changes very gently as indicated in FIG. 9B. The differentiator 41 differentiates the wave detection voltage Vt2 with time to acquire a changing rate τ5 of the wave detection voltage Vt2. Since the changing rate τ5 of the wave detection voltage Vt2 is substantially "0" and is therefore less than the predetermined τA, the wave detection voltage Vt2 is not allowed to pass through the differentiator 41. Therefore, the high-pass filter 42 is supplied with a constant value of voltage (2.5 V) from the power source 44 as in the steady state. Since the changing rate τ2 of this voltage is substantially "0" and is less than the predetermined value τB, the voltage is not allowed to pass through the high-pass filter 42. Therefore, the voltage Vt3 exhibits a constant value (2.5 V) as indicated in FIG. 9C, and is applied to the inversion input terminal 43a of the comparator 43.

The non-inversion input terminal 43b of the comparator 43 receives a reference voltage Vt4 from the power source 44. The reference voltage Vt4 is slightly lower than 2.5 V since the voltage is supplied via the resistors R3 to R5.

Comparison between the voltage Vt3 applied to the inversion input terminal 43a of the comparator 43 and the reference voltage Vt4 applied to the non-inversion input terminal 43b shows that the voltage Vt3 does not become lower than the reference voltage Vt4. Therefore, the comparator 43 does not output the human body detection signal. Hence, the ECU 10 does not output the unlock signal to the door lock portion 19, so that the door is not unlocked.

Thus, considering that different objects cause different changing rates of capacitance, the human body detector 1 of this embodiment is designed so as to output the human body detection signal only when the detection means 4 detects a voltage that reduces by the predetermined amount in 5 to 50 msec. That is, voltage having a changing rate τ greater than or equal to the predetermined value τA (a changing rate corresponding to a predetermined amount of reduction in 50 msec) is allowed to pass through the differentiator 41, and voltage having a smaller changing rate τ is excluded. Therefore, the human body detector 1 does not output the human body detection signal, even if a dielectric object exhibiting a very gentle changing rate τ, such as an outside air temperature change or the like, contacts the handle grip 25. Furthermore, voltage having a changing rate that is greater than or equal to the predetermined value τB (a changing rate corresponding to a predetermined amount of reduction in 5 msec) is allowed to pass through the high-pass filter 42, and voltage having a greater changing rate τ is excluded. Therefore, the human body detector 1 does not output the human body detection signal even if a dielectric object having a very sharp changing rate τA, such as a raindrop or the like, contacts the handle grip 25. Consequently, the human body detector 1 distinguishes between a human body and an outside air temperature change or between a human body and a raindrop, and therefore is able to detect only a human body and output the human body detection signal. The smart entry system incorporating the human body detector 1 avoids false detection caused by a raindrop or the like and therefore avoids useless transmission of the human body detection signal, and therefore can be effectively used outdoors.

Furthermore, since a band-pass filter is formed by the two differentiators (the differentiator 41 and the high-pass filter 42) and the comparator 43, the circuit arrangement can be simplified, and low cost can be achieved.

Still further, voltage is checked by the differentiator 41 and the high-pass filter 42, only voltage within a predetermined band ($\tau A \leq \tau \leq \tau B$) is reliably allowed to pass, so that the detection precision of the human body detector 1 can be improved.

It should be apparent that the human body detector of the invention is not restricted in any manner by the foregoing embodiment, but may be suitably modified.

For example, although in the foregoing embodiment, the human body detector 1 is provided in the door handle 23, the human body detector 1 may be provided in an open/close portion of a trunk of a vehicle.

For example, although in the foregoing embodiment, the detection means 4 is formed by an electronic hardware circuit, data may be A/D converted, and may be processed by a CPU.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A human body detector comprising:

a capacitance-type sensor that a human body contacts or approaches, the capacitance-type sensor including a sensor resonance circuit and a wave detector circuit;

detection means for receiving an output of the capacitance-type sensor, and distinguishing between the human body from a raindrop and detecting only the human body based on a change in the output within a predetermined time, the detection means including a band-pass filter, the band-pass filter including a differentiator, a high-pass filter and a comparator; and wherein the sensor resonance circuit has a sensor electrode supplied with a constant frequency voltage and outputs a resonance voltage integrated the constant frequency voltage with respect to a capacitance of an object that contacts to the sensor electrode, the wave detector circuit outputs a wave detection voltage obtained through wave detection and conversion of the resonance voltage, and the differentiator differentiates the wave detection voltage with respect to time to acquire the changing rate.

2. A human body detector according to claim 1, wherein the detection means allows a voltage to pass if a changing rate of the output is in a predetermined band.

3. A human body detector according to claim 1, wherein the human body detector is disposed in a door handle of a motor vehicle, and detects a contact between the door handle and the human body.

4. A human body detector according to claim 1, wherein the human body detector is installed in a vehicle-installed apparatus of a smart entry system.

5. A human body detector according to claim 1, wherein the capacitance-type sensor includes a sensor resonance circuit and a wave detector circuit.

6. A human body detector according to claim 1, wherein the high-pass filter permits passage of a wave detection voltage if a changing rate of the wave detection voltage exceeds a predetermined voltage after passage of 5 msec.

7. A human body detector according to claim 1, wherein the differentiator permits passage of a wave detection voltage if a changing rate of the wave detection voltage exceeds a predetermined voltage within 50 msec.

8. A human body detector according to claim 1, wherein the high-pass filter excludes a relatively sharp changing rate of voltage while the differentiator excludes a relatively gentle changing rate of voltage.

* * * * *